Patented Aug. 20, 1940

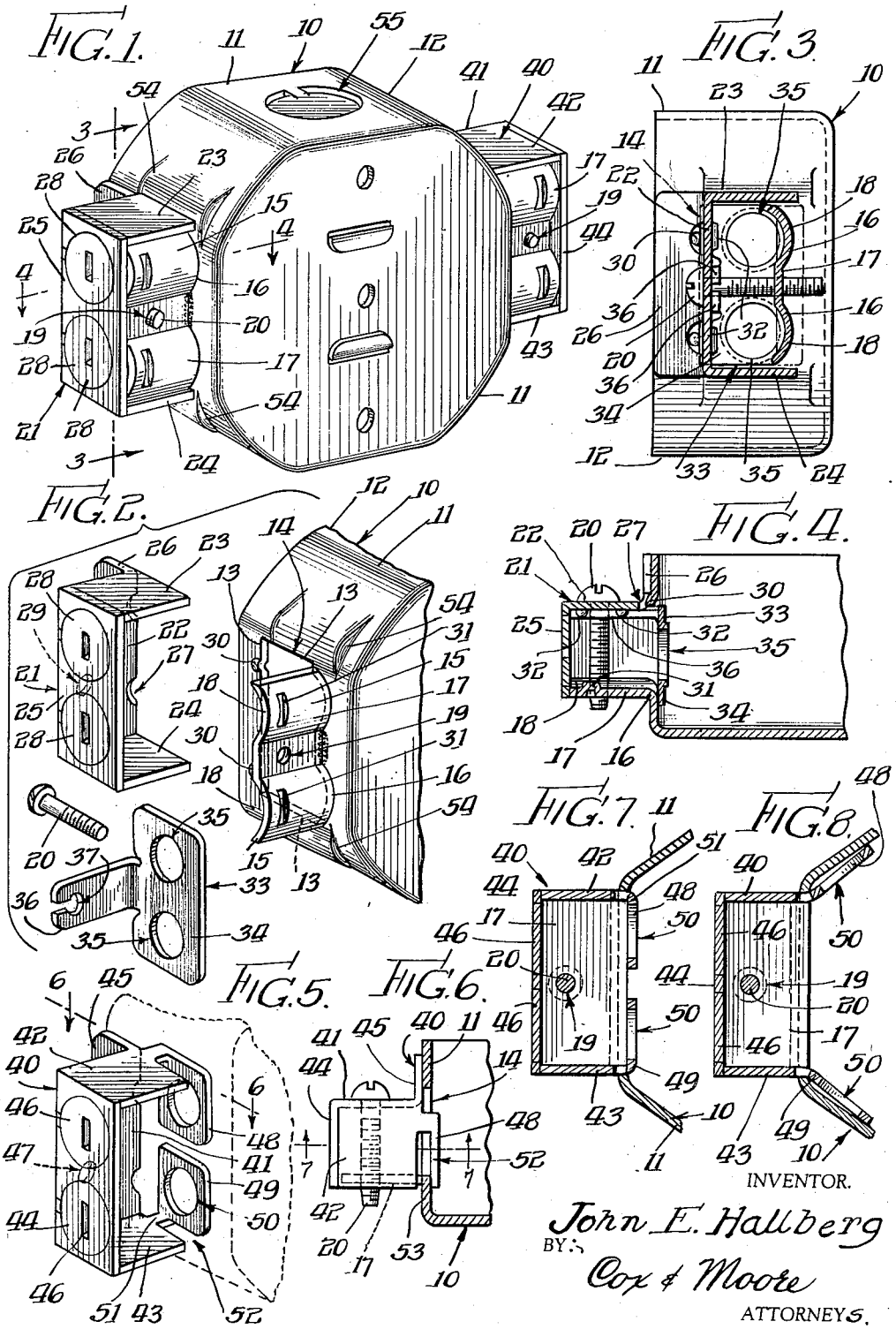

2,211,929

UNITED STATES PATENT OFFICE 2,211,929

OUTLET BOX

John E. Hallberg, Aurora, Ill., assignor to All-Steel-Equip Company, Aurora, Ill., a corporation of Illinois Application February 14, 1938, Serial No. 190,409

3 Claims. (Cl. 220—3.2)

This invention relates to electrical receptacles and particularly to outlet boxes. More specifically, the invention relates to an outlet box having a housing arranged exteriorly of the box itself, as disclosed in United States Letters Patent No. 2,000,851, granted May 7, 1935; also, similar to the type disclosed in co-pending application filed concurrently herewith, Serial No. 190,433.

An important object of the invention is the provision of an outlet box having an exteriorly mounted housing, the housing being shiftably mounted with respect to cable supporting arms which are struck outwardly from the box whereby a cable may be clamped between the cable supporting arms and the exteriorly mounted shiftable housing.

Another object is the provision of a shiftable housing mounted adjacent the wall of an outlet box and movable with respect to the walls of the box whereby either flexible metallic or flexible non-metallic cable may be used and locked in position without in any way damaging the cable or the leads encased in the cable sheath.

A further object of the invention is the provision of an outlet box having a portion of a wall thereof struck outwardly to provide an arm or shelf upon which the cable rests, there being a movable member or housing arranged in juxtaposition with respect to the shelf and co-operating therewith whereby a cable may be locked tightly in position with respect to the box.

A still further object of the invention is to provide an outlet box construction having new and improved means for rendering the box capable for use with both flexible metallic and flexible non-metallic cable, there being bushed openings in formed knock-out sections whereby the box is rendered convertible for the accommodation of either or both types of cable.

Numerous other objects and advantages will be apparent throughout the progress of the following specification.

The accompanying drawing illustrates selected embodiments of the invention and the views therein are as follows:

Fig. 1 is a detail perspective view of an outlet box and embodying the invention;

Fig. 2 is a detail view showing several parts of the improved box and embodying the invention;

Fig. 3 is a detail sectional view on the line 3—3 of Fig. 1;

Fig. 4 is a detail sectional view on the line 4—4 of Fig. 1;

Fig. 5 is a detail perspective view of the other housing, it being shown applied to box in Fig. 1;

Fig. 6 is a detail sectional view on the line 6—6 of Fig. 5;

Fig. 7 is a detail sectional view on the line 7—7 of Fig. 6; and

Fig. 8 is a view similar to Fig. 7 but showing certain parts bent outwardly instead of inwardly as shown in Figs. 5-7.

In the present embodiment shown for the purpose of illustrating the invention, an outlet box 10 of any conventional shape has a plurality of integrally connected sides 11 forming an enclosing wall 12. A side 11 may be cut along the three sides 13, Fig. 2, leaving a relatively rectangularly shaped opening 14 from which there extends an outwardly extending rectangularly shaped portion 15. The portion 15 is left integrally connected with the box along the line indicated at 16, being bent outwardly substantially at right angles, as indicated in Fig. 2, to provide a cable receiving arm or shelf 17. This arm or shelf 17 may be dished to provide cable receiving surfaces 18. A threaded opening 19 may be provided in the shelf 17 to receive a fastening element or screw 20 which co-operates with a movable or shiftable exteriorly positioned housing 21.

The housing 21 is provided with a top 22, sides 23 and 24, and an end 25, and is adapted to engage a side 11 of the box 10 and co-operate with the cable receiving arm or shelf 17. The interior width of the housing 21 is wider than the outside over-all dimension of the shelf 17 so that the shelf 17 is free to extend into the housing upon vertical movement of the housing. A flange 26 extends upwardly from the end of the housing and is adapted to engage a side wall 11 of the box 10. One or more openings 27 may be provided in the top of the housing at the point where the flange 26 joins the top 22 so as to provide sight or inspection openings. Openings of this kind are desired so that the underwriters' inspectors may examine the box from the outside to see that the insulation around the leads which are encased in the metal sheath has not been damaged or mutilated and is in proper shape.

The end 25 of the housing 21 may have knock-outs 28 provided therein which are adapted to be brought into position and in relative alinement with the dished surfaces 18 so that when a cable is inserted through a knock-out 28 it will co-operate with a dished surface 18 of the shelf 17. An opening 29 is provided in the top 22 to receive the screw 20 to hold the housing in proper position with respect to the shelf 17. In-and-out movement of the screw 20 permits vertical movement of the housing 21, and when the screw 20 is tightened sufficiently, it will cause a binding or impinging action upon the cable which is inserted through a knock-out 28. The face 11 of the outlet box adjacent the housing 21 may be provided with outwardly extending protuberances 30 against which the flange 26 is adapted to co-operate in its vertical movement when the housing is lowered a predetermined amount. Ordinarily these protuberances will extend through a part of the openings 27 and assist in maintaining the housing in relatively rigid position. The housing 21 co-operates with the shelf 17 for clamping a cable therebetween and the shelf 17 forms a bottom for the housing. In cases where flexible non-metallic cable is used, the cable is inserted through a knock-out 28 and through the opening 14, the cable being clamped by the tightening effect of the screw 20 engaging the threaded opening 19 in the shell for drawing the housing toward the shelf.

In order to prevent any damage to the fabric sheath, projections 31 may be formed in the dished surfaces 18 of the shelf 17 and co-operate with oppositely disposed projections 32 projecting downwardly from the underside of the top 22 of the housing 21. The cable is therefore held by the projections 31 and 32 when the screw 20 is tightened, and as these projections are smooth and rounded, no cutting or mutilation of the sheath can occur. Where metallic cable is used, particularly the type of cable known as BX cable, bushed openings are required to act as a protection against cutting and grounding of the wires used in connection with the metallic sheathed cable. Therefore, a closing element 33 may be provided for the opening 14. This closing element comprises a plate 34 having bushed openings 35 provided therein. These bushed openings are adapted to co-operate with and be positioned with respect to the knock-outs 28 and the dished surfaces 18 of the shelf 17. The plate 34 is provided with an outwardly extending leg 36 having an opening 37 provided near its extreme outer end to receive the fastening means 20, and this closure element 33 is adapted to close the opening 14 when BX cable is used. It is free to have vertical movement depending upon the position of the housing and the clamping engagement of the housing with respect to the cable. Therefore, when BX cable is used, it may be inserted through a knock-out 28 and then extend through a bushed opening 35 whereby the insulation about the leads will be protected. Where the non-metallic flexible cable is used, the element 33 may be omitted. In all cases the box will be sufficiently closed to prevent any sparking or flashing inside of the box from getting outside of the box because all openings are either closed by a part of the housing or a part of the box. The outlet box housing 21 and its co-operating parts 17, 20 and 33 are therefore adapted for use in connection with BX cable and answer all the requirements of the underwriters. Where flexible non-metallic cable is used, the element 33 may be omitted and still all the requirements of the underwriters are complied with.

The outlet box 10 may also be provided with a housing 40 positioned at the side of the outlet box opposite to the side carrying the housing 21. This housing 40 also co-operates with a cable supporting shelf 17 and is also movable vertically with respect to the rigid shelf 17. The housing 40 and the shelf 17 are also constructed so as to accommodate both metallic and non-metallic cable. The housing 40 has a top 41, sides 42 and 43, and an end closure 44. The elements 41—44, inclusive, are similar to the parts 22—25, inclusive, described in respect to the housing 21. The housing 40 also has an upwardly extending integral flange 45 which is similar to the previously described flange 26. Knock-outs 46 are provided in the end 44 and an opening 47 is provided in the top 41 to receive a screw 20. The screw 20 co-operates with the opening 19 in the shelf 17 and is provided for permitting vertical movement of the housing 40 with respect to the shelf 17. The sides 42 and 43 of the housing 40 may be provided with inwardly extending portions 48 and 49, respectively. The extensions 48 and 49 are each provided with bushed openings 50, the extensions being bent at 51 so as to bring the bushed openings 50 into alinement with the knock-outs in the outer end 44. Thus, when metallic cable is used, a knock-out 46 is removed and the cable and sheath extended through the opening. The cable minus the sheath will extend through a bushed opening 50. When non-metallic cable is used, the extensions 48 and 49 may be bent back against the face of the box as shown in Fig. 8. Therefore, the non-metallic cable will extend through an opening when a knock-out 46 is removed and extend into the interior of the box, the screw 20 causing clamping action against the cable between the lower surface of the housing and the upper surface of the shelf 17, the under surface of the top 41 and the upper surface of the shell being provided with the same cable gripping projections 32, 31, respectively.

The housing 40 may also be provided with inspection or sight openings 27. The extensions 48 and 49 may also be provided with slots 52 which engage the outlet box below the top of the shelf 17 at 53, and to permit the housing to slide freely over the shelf 17 the shelf must necessarily be slightly narrowed or the sides 42 and 43 slightly bent inwardly so as to permit free slidable movement of the housing over the shelf because of the fact that the sides 42 and 43 extend into the opening. Therefore, the shelf must be narrower than the opening an amount equal to the thickness of the metal constituting the side walls 42 and 43.

The box may also be provided with projecting portions 54 struck outwardly from the box so as to provide a flat surface on the sides of the box where the housing is mounted. Other knock-outs 55 may be positioned in the walls of the box as desired or required, and means for mounting or fastening a hickey to a box, as well as other openings for mounting the box in position may be provided if and when desired.

The invention provides a relatively simple outlet box comprising a rigid cable supporting shelf co-operating with a movable exteriorly positioned housing so as to clamp a cable therebetween and hold the cable in proper fixed position with respect to the box. The box as constructed is adaptable for use in connection with either metal or non-metallic cable.

Changes may be made in the form, construction and arrangement of parts without departing from the spirit of the invention or sacrificing any of its advantages, and the right is hereby reserved to make all such changes as fairly fall within the scope of the following claims.

The invention is hereby claimed as follows:

1. An outlet box comprising a plurality of side walls providing a closure, a shelf struck outwardly from a wall at substantially right angles thereto providing a cable supporting shelf and leaving an opening in said wall for the reception of a cable, a movable clamp cooperating with the shelf to receive a cable between the shelf and a part of the clamp, and fastening means for locking the parts together to clamp a cable therebetween.

2. An outlet box comprising a plurality of side walls providing a closure, a shelf struck outwardly from a wall at substantially right angles thereto providing a cable supporting shelf and leaving an opening in said wall for the reception of a cable, a housing positioned at said wall, said housing being vertically movable toward and away from said shelf, whereby a cable may be positioned between the shelf and housing, means cooperating with the housing and shelf to lock the cable therebetween, and arms on said housing and extending into said opening, said arms having cable receiving openings therein.

3. An outlet box comprising a body having side walls, a shelf struck outwardly from one side wall of said body at substantially right angles thereto, providing a cable-supporting shelf and leaving a struck out opening in the wall adjacent the shelf, a housing adjacent said wall, said housing being movable toward and away from said shelf, means cooperating with the housing and shelf to adjust said housing in said path of movement to clamp a cable therebetween, and arms of relatively small sectional area on said housing and extending into said opening, said arms terminating in plates within the housing having guide openings therein, said housing having knock-outs in its outer wall opposite said openings to receive cable passing into said box, said arms being adapted to be relatively readily bent to permit said plates to be displaced away from said opening for facilitating the use of nonmetallic cable.

JOHN E. HALLBERG.